3,380,990
THIAZOLYL AZO DYESTUFFS
David J. Wallace, James M. Straley, and Max A. Weaver, Kingsport, Tenn., assignors to Eastman Kodak Company, Rochester, N.Y., a corporation of New Jersey
No Drawing. Filed May 24, 1965, Ser. No. 458,467
11 Claims. (Cl. 260—158)

ABSTRACT OF THE DISCLOSURE

Water-insoluble thiazolylazo-aniline dyestuffs having attached to the aniline nitrogen atom

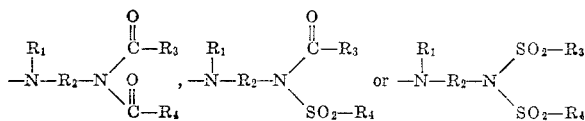

wherein $R_1$ is H, aliphatic or aromatic, $R_3$ is lower alkylene and $R_3$ and $R_4$ are each aliphatic or aromatic which dyestuffs are useful in dyeing hydrophobic textile materials with good fastness properties.

---

This invention relates to azo compounds particularly useful as dyes for textile fibers, yarns and fabrics. More particularly this invention relates to azo compounds of the general formula

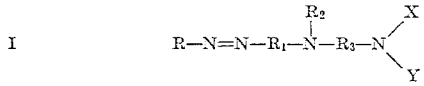

wherein:

R represents a 2-thiazolyl radical having the general formula

in which "Vin" is a vinylene radical, for example unsubstituted vinylene, mono- and di-substituted vinylene groups, such as

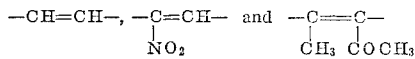

as present in 2-aminothiazole and the substituted 2-aminothiazoles described in the examples and table below. The lower alkyl, lower trihaloalkyl, lower alkylsulfonyl, nitro and thiocyano substituted 2-aminothiazoles are particularly efficacious for use in preparing the azo compounds.

$R_1$ represents p-phenylene or p-phenylene substituted with lower alkyl, e.g. methyl-p-phenylene; lower alkoxy, e.g. methoxy-p-phenylene, 2,5-dimethoxy-p-phenylene; halogen, e.g. chloro-p-phenylene; lower alkylthio, e.g. methylthio-p-phenylene; lower alkanoylamido, e.g. acetamido-p-phenylene; or lower alkylsulfonamido, e.g. methylsulfonamido-p-phenylene.

$R_2$ represents hydrogen or an alkyl radical preferably lower alkyl, i.e. from 1 to 4 carbon atoms, being unsubstituted or substituted such as hydroxyalkyl, e.g. hydroxyethyl; lower alkoxyalkyl, e.g. methoxyethyl; cyanoalkyl, e.g. cyanoethyl; lower alkanoyloxyalkyl, e.g. acetoxyethyl; lower carboalkoxyethyl, e.g. carbethoxyethyl; halogenoalkyl, e.g. chloroethyl; lower alkylsulfonylalkyl, e.g. methyl sulfonylethyl; carboxamidoalkyl, e.g. carboxamidoethyl, etc. or $R_2$ represents a monocyclic aromatic radical of the benzene series such as unsubstituted phenyl and substituted phenyl such as lower alkylphenyl, lower alkoxyphenyl and halophenyl.

$R_3$ represents a lower alkylene group, i.e. a straight or branched chain of from 1 to 4 carbon atoms, and X and Y represent the same or different acyl groups, such as, lower alkanoyl; e.g. propionyl; aroyl, e.g. benzoyl, lower alkylbenzoyl, lower alkoxybenzoyl, halobenzoyl; lower alkoxycarbonyl, e.g. ethoxy carbonyl; carbamoyl; e.g. phenyl carbamoyl; etc. or sulfonyl groups such as lower alkylsulfonyl, e.g. methylsulfonyl; arylsulfonyl, e.g. phenylsulfonyl, lower alkylphenylsulfonyl, lower alkoxyphenylsulfonyl, halophenylsulfonyl; etc.

The azo compounds of this invention are prepared by diazotization of the 2-aminothiazoles described above and coupling the diazotized products with the coupler of general formula III 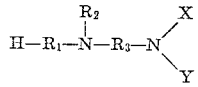

wherein $R_1$, $R_2$, $R_3$, X and Y have the meanings given above.

Accordingly, the invention contemplates compounds of the three general formulas:

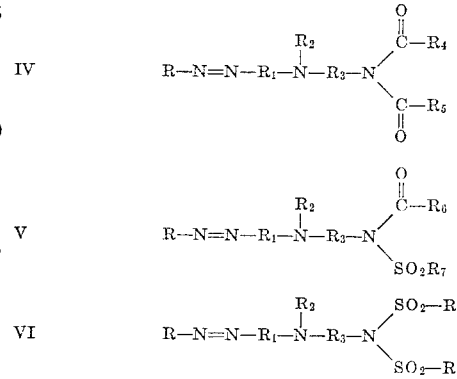

wherein:

$R_4$ and $R_5$=lower alkyl, lower alkoxy, phenyl or phenyl substituted with lower alkyl, lower alkoxy, or halogen, $R_6$ and $R_7$=lower alkyl, phenyl, or phenyl substituted with lower alkyl, lower alkoxy, or halogen, and $R_8$ and $R_9$=lower alkyl, phenyl, or phenyl substituted with lower alkyl, lower alkoxy or halogen.

The specific alkyl radicals and monovalent analogs of the p-phenylene radicals given above are also exemplary of the $R_4$–$R_9$ group.

The groups X and Y differentiate these compounds from prior art compounds and favorably affect the dye characteristics such as light fastness and resistance to sublimation, especially when the compounds are used for dyeing textile materials. The substituents attached to thiazolyl radical R or $R_1$–$R_9$ are not critical and serve primarily as auxochromes to control the color of the azo compound.

The coupling components having the above Formula III are prepared in the following manner:

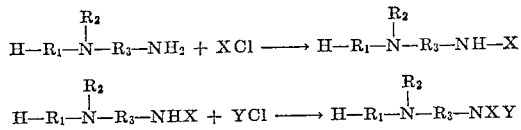

wherein $R_1$, $R_2$, $R_3$, X and Y are as defined above. These reactions result in compounds in which the newly substituted amines are diacyl substituted, disulphonyl substituted or acylsulphonyl substituted depending on the reactants chosen. A more detailed description of the coupler synthesis appears in preparative examples below.

The resultant azo compounds can be used for dyeing textile materials including synthetic polymer fibers, yarns and fabrics giving a variety of fast shades including blue, yellow, red and brown when applied thereto by conventional dyeing methods. The compounds have excellent to moderate affinity for cellulose ester, polyester and polyamide fibers and possess the valuable property of staining wool less than do previous thiazole dyes. When the azo compounds are used for dyeing such hydrophobic materials, they should be free of water-solubilizing groups such as sulfo and carboxyl. In general the dyes have good fastness, for example, to light, washing, gas (atmospheric fumes) and sublimation.

The following examples will serve to illustrate the preparation of representative couplers and azo compounds of our invention.

EXAMPLES OF COUPLERS

Preparation of N-[2-(N'-ethyl-m-toluidino)ethyl]diacetamide 19.7 g. N-2-chloroethyl-N-ethyl-m-toluidine, 15.2 g. diacetamide, 13.8 g. potassium carbonate and 100 cc. dimethylformamide were heated and stirred together for 2 hrs. at 125° C. The mixture was drowned in water, and the product extracted with 2–50 cc. portions of chloroform. The combined extracts were washed once with water and dried over anhydrous sodium sulfate. The chloroform was stripped off under vacuum, leaving an oily product.

Preparation of N-acetyl-N-[2-(N'-ethyl-m-toluidino)ethyl]methanesulfonamide 139 g. N-[2-(N'-ethyl-m-toluidino)ethyl]methanesulfonamide, sodium salt, was stirred in 300 cc. dry dimethylformamide. 39.3 g. acetyl chloride was added dropwise below 55° C. After 2 hrs. heating on the steam bath, the reaction mixture was drowned in dilute aqueous sodium hydroxide and stirred until the product solidified. The solid was filtered off, washed with water, and dried at room temperature. The product was a white solid, M.P. 55–58°. Recrystallization from ethanol gave a product melting at 63–64° C.

Preparation of N-benzoyl-N-[2-(N'-ethyl-m-toluidino)ethyl]methanesulfonamide 139 g. N-[2-(N'-ethyl-m-toluidino)ethyl]methane sulfonamide, sodium salt was stirred in 300 ml. dimethylformamide and 70 g. benzoyl chloride was added dropwise over 1 hour. The temperature rose to 65° C. during the addition. The reaction was then heated on the steam bath for 2 hours, then poured into water. The product came down as an oil which was washed by decantation and crystallized on standing. A recrystallized sample (methanol) melted at 138–139.5° C.

Preparation of N-[2-(N'-ethyl-m-toluidino)ethyl]dimethanesulfonamide 27.8 g. N-[2-N'-ethyl-m-toluidino)ethyl]methanesulfonamide, sodium salt, was dissolved in 100 cc. dry dimethylformamide. 11.5 g. methanesulfonyl chloride was added dropwise with stirring. The temperature rose to 75° C. After heating 1 hr. at 75–90°, the reaction mixture was drowned in water. The oily product crystallized on standing. It was filtered off, washed with water, and recrystallized from 50 cc. ethanol. White solid, M.P. 77–78.5°.

These examples are illustrative of the procedures utilized for preparation of the coupler moiety of the dyes in the table below.

EXAMPLES OF THE DYES

Example 1

(A) Diazotization: 2.9 g. (0.02 m.) 2-amino-5-nitrothiazole was stirred in 60 cc. water and 32 cc. conc. sulfuric acid was added. Immediate solution resulted. The solution was cooled to −10° C. and a solution of 1.4 g. $NaNO_2$ in 16 cc. conc. sulfuric acid was added to −5° C. Stirring at −5° C. was continued for ten minutes.

(B) Coupling: 6.68 g. (0.02 m.) N-[2-(N'-ethyl-m-toluilino)ethyl] dimethanesulfonamide was dissolved in 100 ml. 15% aqueous sulfuric acid. The coupling solution was cooled in an ice-bath and the diazonium solution for (a) above was added, with stirring. After coupling 10 minutes, the mixture was drowned with water, filtered, washed with water, and dried. The product dyes cellulose acetate and polyester fibers deep violet shades of unusually good fastness properties. The product has the formula:

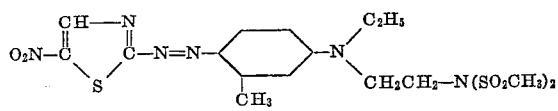

Example 2

Example 1 procedure is carried out except using as the coupler, 5.24 g. N-[2-(N'-ethyl-m-toluidino)ethyl] diacetamide. The product dyes cellulose acetate and polyester fibers a deep violet shade of good fastness properties. The product has the formula:

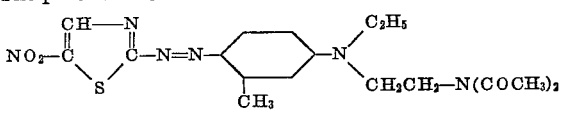

Example 3

Example 1 procedure is carried out except using as the coupler, 7.52 g. of N-benzoyl-N-[2-(N'-ethyl-m-toluidino)ethyl] methanesulfonamide. The product dyes cellulose acetate and polyester fibers a deep violet, shade of good fastness properties.

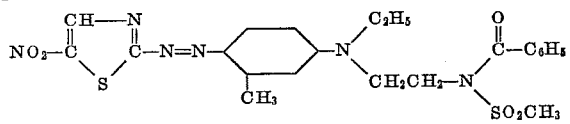

Example 4

Example 1 procedure is carried out except using as the coupler, 6.56 g. N-ethoxycarbonyl-N-[2-(N'-ethyl-m-toluidino)ethyl] methanesulfonamide. The product dyes cellulose acetate and polyester fibers a deep violet shade of good fastness properties.

The azo compounds of the following table were made by the above method. Thus, the 2-aminothiazoles are coupled with the appropriate amine couplers of Formula III. The substituent variation is indicated by the table.

| Ex. No. | Substituents on the Diazotized 2-aminothiazole | Substituents on the Phenylene Radical $R_1$ | $R_2$ | $R_3$ | X | Y | Coloring of Polyester Dyings |
|---|---|---|---|---|---|---|---|
| 5 | 5-$NO_2$ | None | —$C_2H_5$ | —$CH_2CH_2$— | —$SO_2CH_3$ | —$COCH_3$ | Violet. |
| 6 | 5-$NO_2$ | 3-$CH_3$ | —$C_2H_4CN$ | —$CH_2CH_2$— | —$SO_2CH_3$ | —$SO_2CH_3$ | Do. |
| 7 | 5-$NO_2$ | 3-$CH_3$ | —$C_2H_4OH$ | —$CH_2CH_2$— | —$COCH_3$ | —$COCH_3$ | Do. |
| 8 | 5-$NO_2$ | 3-$CH_3$ | —$C_2H_4Cl$ | —$CH_2CH_2$— | —$SO_2CH_3$ | —$SO_2CH_3$ | Do. |
| 9 | 5-$NO_2$ | 3-$CH_3$ | —$C_2H_5$ | —$CH_2CH_2CH_2$— | —$SO_2CH_3$ | —$SO_2CH_3$ | Do. |
| 10 | 5-$NO_2$ | 3-$CH_3$ | —$C_2H_5$ | —$CH_2CH(CH_3)CH_2$— | —$SO_2CH_3$ | —$SO_2CH_3$ | Do. |
| 11 | 5-$NO_2$ | 3-$OCH_3$ | —$C_2H_5$ | —$CH_2CH_2$— | —$SO_2CH_3$ | —$SO_2CH_3$ | Blue. |
| 12 | 5-$NO_2$ | 3-Cl | —$C_2H_5$ | —$CH_2CH_2$— | —$SO_2CH_3$ | —$SO_2CH_3$ | Violet. |
| 13 | 5-$NO_2$ | 3-$NHCOCH_3$ | —$C_2H_5$ | —$CH_2CH_2$— | —$SO_2CH_3$ | —$SO_2CH_3$ | Blue. |
| 14 | 5-$NO_2$ | 3-$OCH_3$-6-$CH_3$ | —$C_2H_5$ | —$CH_2CH_2$— | —$SO_2CH_3$ | —$SO_2CH_3$ | Do. |
| 15 | 5-$NO_2$ | 2,5-di-$OCH_3$ | —$C_2H_5$ | —$CH_2CH_2$— | —$SO_2CH_3$ | —$SO_2CH_3$ | Do. |
| 16 | 5-$NO_2$ | 3-$CH_3$ | —$C_2H_4NXY$ | —$CH_2CH_2$— | —$SO_2CH_3$ | —$SO_2CH_3$ | Violet. |
| 17 | 5-$NO_2$ | 3-$CH_3$ | —$C_2H_5$ | —$CH_2CH_2$— | —$SO_2CH_3$ | —$COC_6H_5$ | Do. |
| 18 | 5-$NO_2$ | 3-$CH_3$ | —$C_2H_5$ | —$CH_2CH_2$— | —$SO_2CH_3$ | —$SO_2C_6H_5$ | Do. |
| 19 | 5-$NO_2$ | 3-$CH_3$ | —$C_2H_5$ | —$CH_2CH_2$— | —$COC_6H_5$ | —$COC_6H_5$ | Do. |
| 20 | 5-$NO_2$ | 3-$CH_3$ | —$C_2H_5$ | —$CH_2CH_2$— | —$SO_2CH_3$ | —$COC_2H_5$ | Do. |
| 21 | 5-$NO_2$ | 3-$CH_3$ | —$C_2H_5$ | —$CH_2CH_2$— | —$SO_2CH_3$ | —$CO_2C_2H_5$ | Do. |
| 22 | 5-$NO_2$ | 3-$CH_3$ | —$C_2H_5$ | —$CH_2CH_2$— | —$SO_2CH_3$ | —$CONHC_6H_5$ | Do. |
| 23 | 5-$NO_2$ | 3-$CH_3$ | —$C_6H_5$ | —$CH_2CH_2$— | —$SO_2CH_3$ | —$SO_2CH_3$ | Blue. |
| 24 | 5-$NO_2$ | 3-$CH_3$ | —$CH_3$ | —$CH_2CH_2$— | —$SO_2CH_3$ | —$SO_2CH_3$ | Violet. |
| 25 | 5-$NO_2$ | 3-$CH_3$ | —$C_2H_4CONH_2$ | —$CH_2CH_2$— | —$SO_2CH_3$ | —$SO_2CH_3$ | Do. |
| 26 | 5-$NO_2$ | 3-$CH_3$ | —$C_2H_4COOCH_3$ | —$CH_2CH_2$— | —$SO_2CH_3$ | —$SO_2CH_3$ | Do. |
| 27 | 5-$NO_2$ | 3-$CH_3$ | —$C_2H_4SO_2CH_3$ | —$CH_2CH_2$— | —$SO_2CH_3$ | —$SO_2CH_3$ | Do. |
| 28 | 4-$CF_3$ | 3-$CH_3$ | —$C_2H_5$ | —$CH_2CH_2$— | —$SO_2CH_3$ | —$SO_2CH_3$ | Red. |
| 29 | 4-$CH_3$ | 3-$CH_3$ | —$C_2H_5$ | —$CH_2CH_2$— | —$SO_2CH_3$ | —$SO_2CH_3$ | Do. |
| 30 | 4-$CO_2C_2H_5$ | 3-$CH_3$ | —$C_2H_5$ | —$CH_2CH_2$— | —$SO_2CH_3$ | —$SO_2CH_3$ | Do. |
| 31 | 4-$NHCOCH_3$ | 3-$CH_3$ | —$C_2H_5$ | —$CH_2CH_2$— | —$SO_2CH_3$ | —$SO_2CH_3$ | Do. |
| 32 | 4-$C_6H_5$ | 3-$CH_3$ | —$C_2H_5$ | —$CH_2CH_2$— | —$SO_2CH_3$ | —$SO_2CH_3$ | Do. |
| 33 | 5-Br | 3-$CH_3$ | —$C_2H_5$ | —$CH_2CH_2$— | —$SO_2CH_3$ | —$SO_2CH_3$ | Pink. |
| 34 | 5-$SO_2C_4H_9$ | 3-$CH_3$ | —$C_2H_5$ | —$CH_2CH_2$— | —$SO_2CH_3$ | —$SO_2CH_3$ | Do. |
| 35 | 4-$CH_3$, 5-$COCH_3$ | 3-$CH_3$ | —$C_2H_5$ | —$CH_2CH_2$— | —$SO_2CH_3$ | —$SO_2CH_3$ | Do. |
| 36 | None | 3-$CH_3$ | —$C_2H_5$ | —$CH_2CH_2$— | —$SO_2CH_3$ | —$SO_2CH_3$ | Violet. |
| 37 | 5-CN | 3-$CH_3$ | —$C_2H_5$ | —$CH_2CH_2$— | —$SO_2CH_3$ | —$SO_2CH_3$ | Do. |
| 38 | 5-$NO_2$ | 3-$CH_3$ | —$CH_2CHOHCH_2OH$ | —$CH_2CH_2CH_2$— | —$COCH_3$ | —$COCH_3$ | Do. |
| 39 | 5-$NO_2$ | 3-$CH_3$ | —$C_2H_4OOCNHC_6H_5$ | —$CH_2CH_2CH_2$— | —$COCH_3$ | —$COCH_3$ | Do. |
| 40 | 5-$NO_2$ | 3-$CH_3$ | —$C_2H_4NHCOCH_3$ | —$CH_2CH_2CH_2$— | —$COCH_3$ | —$COCH_3$ | Do. |
| 41 | 5-$NO_2$ | 3-$CH_3$ | -Cyclohexyl | —$CH_2CH_2CH_2$— | —$COCH_3$ | —$COCH_3$ | Do. |
| 42 | 5-$NO_2$ | 2-$CH_3$ | H | —$CH_2CH_2CH_2$— | —$COCH_3$ | —$COCH_3$ | Do. |
| 43 | 5-$NO_2$ | 2-$CH_3$ | —$C_2H_4COCH_3$ | —$CH_2CH_2CH_2$— | —$COCH_3$ | —$COCH_3$ | Do. |
| 44 | 5-$NO_2$ | 2-$CH_3$ | —$C_2H_4COC_2H_5$ | —$CH_2CH_2CH_2$— | —$COCH_3$ | —$COCH_3$ | Do. |
| 45 | 5-$NO_2$ | 3-$CH_3$ | —$C_2H_5$ | —$CH_2CH_2$— | —$COCH_3$ | —$SO_2CH_3$ | Do. |
| 46 | 5-$NO_2$ | 3-$CH_3$ | —$C_2H_5$ | —$CH_2CH_2$— | —$COCH_3$ | —$COCH_3$ | Do. |
| 47 | 5-$NO_2$ | 3-$CH_3$ | —$C_2H_5$ | —$CH_2CH_2$— | —$SO_2CH_3$ | —$SO_2CH_3$ | Do. |
| 48 | 5-$NO_2$ | 3-$CH_3$ | —$C_2H_5$ | —$CH_2CH_2$— | —$COC_6H_5$ | —$SO_2CH_3$ | Do. |
| 49 | 5-$NO_2$ | 3-$CH_3$ | —$C_2H_5$ | —$CH_2CH_2$— | —$CO_2C_2H_5$ | —$SO_2CH_3$ | Do. |

The azo compound of the invention may be used for dyeing hydrophobic fibers such as linear polyester, cellulose ester, acrylic, polyamide, etc., fibers in the manner described in U.S. Patents 2,880,050, 2,757,064, 2,782,187 and 2,043,827. The following examples illustrate methods by which the azo compounds of the invention can be used to dye polyester textile materials.

0.1 gram of the dye is dissolved in the dye pot by warming in 5 cc. of ethylene glycol monomethyl ether. A 2% sodium-N-methyl-N-oleyl taurate and 0.5% sodium lignin sulfonate aqueous solution is added with stirring, until a fine emulsion is obtained. Water is then slowly added to a total volume of 200 cc. 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dyebath is then brought to the boil and held at the boil for one hour. Following this, the fabric is rinsed in warm water, then scoured in an aqueous 0.2% soap, 0.2% soda ash solution. After scouring, the fabric is rinsed with water and dried. Accordingly, since the azo compounds of the invention are water-insoluble, they can be applied from aqueous dispersions in the manner of the so-called "dispersed dyes." However, coloration can also be effected, for example, by incorporating the azo compounds into the spinning dope and spinning the fiber as usual. The azo compounds of our invention have varying utility as dyes. The degree of utility varies, for example, depending upon the material being dyed and the formula of the azo compound. Thus, for example, all the dyes will not have the same degree of utility for the same material.

By cellulose aliphatic carboxylic acid esters having 2 to 4 carbon atoms in the acid groups thereof, we means to include, for example, both partially hydrolyzed and unhydrolyzed cellulose acetate, cellulose propionate and cellulose acetatebutyrate.

Polymeric linear polyester materials of the terephthalate type are illustrative of the linear aromatic polyester textile materials that can be dyed with the new azo compounds of our invention. The terephthalate fibers sold under the trademarks "Kodel," "Dacron" and "Terylene," for example, in the form of filaments, yarn and fabric, for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745 and 2,989,363, for example can be dyed. The linear aromatic polyester materials specifically named have a melting point of at least 200° C.

Nylon in fiber, yarn and fabric form is representative of polyamides which can be dyed with the azo compounds.

The invention has been described in considerable detail with particular reference to certain preferred embodiments thereof, but it will be understood that variations and modifications can be effected within the spirit and scope of the invention as described hereinabove, and as defined in the appended claims.

What we claim is:

1. A water-insoluble monoazo compound having the formula

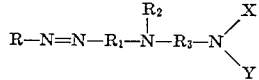

wherein:
R = a 2-thiazolyl radical;
$R_1$ = p-phenylene or p-phenylene substituted with lower alkyl, lower alkoxy, lower alkylthio, lower alkanoylamido, lower alkylsulfonamido, or halogen;
$R_2$ = hydrogen; lower alkyl; lower alkyl substituted with hydroxy, lower alkoxy, cyano, lower alkanoyloxy, lower carboalkoxy, halogen, lower alkylsulfonyl, or carboxamido; phenyl; or phenyl substituted with lower alkyl, lower alkoxy, or halogen;
$R_3$ = lower alkylene; and
X and Y are the same or different and each represents lower alkanoyl, benzoyl, lower alkylbenzoyl, lower alkoxybenzoyl, halobenzoyl, lower alkoxycarbonyl, carbamoyl phenylcarbamoyl, lower alkylsulfonyl, phenylsulfonyl, lower alkylphenylsulfonyl, lower alkoxyphenylsulfonyl, or halophenylsulfonyl.

2. A water-insoluble monoazo compound according to claim 1 wherein R=21-thiazolyl or 2-thiazolyl substituted with lower alkyl, trifluoromethyl, lower alkylsulfonyl, nitro, or thiocyano.

3. A water-insoluble monoazo compound according to claim 1 wherein:
R=2-thiazolyl or 2-thiazolyl substituted with lower alkyl, trifluoromethyl, lower alkylsulfonyl, nitro or thiocyano;
$R_1$=p-phenylene, lower alkyl-p-phenylene, lower alkoxy-p-phenylene, lower alkanoylamido-p-phenylene, or halo-p-phenylene;
$R_2$=lower alkyl or lower alkyl substituted with halogen, hydroxy, cyano, or lower alkanolyloxy; and
X and Y are the same or different and each represents lower alkanoyl, benzoyl, lower alkylsulfonyl, or phenylsulfonyl.

4. A water-insoluble monoazo compound according to claim 3 wherein:
$R_1$=p-phenylene or lower alkyl-p-phenylene;
$R_2$=lower alkyl;
$R_3$=ethylene; and
X and Y represent lower alkanoyl.

5. A water-insoluble monoazo compound according to claim 3 wherein:
$R_1$=p-phenylene or lower alkyl-p-phenylene
$R_2$=lower alkyl;
$R_3$=ethylene; and
X=lower alkanoyl; and
Y=lower alkylsulfonyl.

6. A water-insoluble monoazo compound according to claim 3 wherein:
$R_1$=p-phenylene or lower alkyl-p-phenylene;
$R_2$=lower alkyl;
$R_3$=ethylene; and
X and Y=lower alkylsulfonyl.

7. An azo compound of the formula

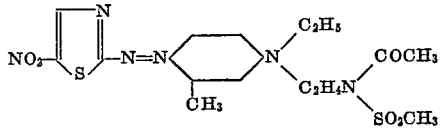

8. An azo compound of the formula

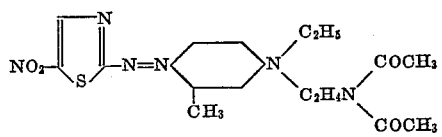

9. An azo compound of the formula

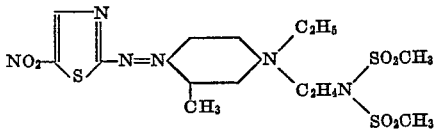

10. An azo compound of the formula

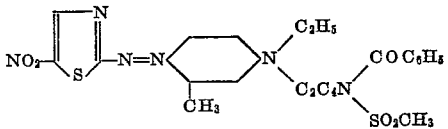

11. An azo compound of the formula

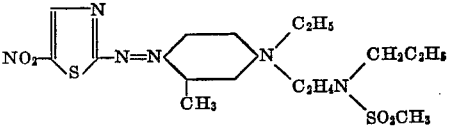

References Cited
UNITED STATES PATENTS

| | | | |
|---|---|---|---|
| 2,346,013 | 4/1944 | Dickey et al. | 250—158 X |
| 2,683,708 | 7/1954 | Dickey et al. | 260—158 |
| 2,871,231 | 1/1959 | Straley et al. | 260—158 |
| 2,955,901 | 10/1960 | Kruckenberg | 260—158 X |
| 3,287,347 | 11/1966 | Hahn et al. | 260—158 |

FLOYD D. HIGEL, *Primary Examiner.*